3,385,849
PROCESS FOR THE PREPARATION OF 17β-PREGNANES FROM 17-OXO-STEROIDS
Alan Martin Krubiner, Cedar Grove, and Eugene Paul Oliveto, Glen Ridge, N.J., assignors to Hoffmann-La Roche Inc., Nutley, N.J., a corporation of New Jersey
No Drawing. Filed July 1, 1965, Ser. No. 468,974
15 Claims. (Cl. 260—239.55)

ABSTRACT OF THE DISCLOSURE

Compounds of the 17β-pregnane series are prepared from 17-oxo-steroids of the androstane series by a process which comprises the steps of reacting a 17-oxo-steroid with ethylidenetriphenylphosphorane and treating the so-obtained $\Delta^{17(20)}$-pregnene with hydroboron and then hydrogen peroxide.

---

The present invention relates to a novel process for the preparation of steroids of the 17β-pregnane series.

Various syntheses are known for the preparation of 17-oxo-steroids of the androstane series. On the other hand, many active and desirable compounds contain a 17β-acetyl or a 17β-(1'-hydroxyethyl) substituent. A variety of methods are known in the art for converting 17-oxo-steroids of the androstane series to 17β-acetyl or 17β-(1'-hydroxyethyl)-steroids, i.e., 20-oxo- or 20-hydroxy-steroids of the 17β-pregnane series, but these prior art methods suffer due to low yields, costly reagents, difficult to handle materials, multiplicity of steps, etc.

The present invention comprehends a process for converting a 17-oxo-steroid of the androstane series into a 20-hydroxy-steroid of the 17β-pregnane series. The so-obtained 20-hydroxy-steroid of the 17β-pregnane series can then, if desired, be oxidized by conventional means, for example, by treatment with chromium trioxide, to the corresponding 20-oxo-steroid of the 17β-pregnane series. The process of this invention proceeds in two stages, gives high yields and is easily manageable. Of critical importance in a process of the type disclosed is, of course, the obtention of the correct stereoconfiguration in the desired end product. In steroids of the pregnane series it is known that the most desirable compounds have a cis relationship between the $C_{18}$ methyl group and the side chain at $C_{17}$, i.e. both the $C_{18}$ methyl group and the $C_{17}$ side chain are β with respect to the plane of the steroid molecule. The process of the present invention is especially advantageous in that in a facile manner it gives an excellent yield of 20-hydroxy-steroids of the pregnane series having a cis relationship between the $C_{18}$ methyl group and the $C_{17}$ side chain. Surprisingly, this is so even with steroids having the unnatural 9β,10α-configuration, i.e., with steroids having a B/C cis ring junction. Accordingly, a particularly preferred aspect of this invention involves the conversion of 9β,10α-17-oxo-steroids of the androstane series into 9β,10α-20-hydroxy-steroids of the 17β-pregnane series having a cis relationship between the $C_{18}$ methyl group and the side chain at $C_{17}$. The process of this invention is more particularly illustrated by the following diagram.

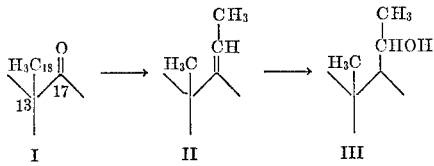

In the above diagram only the carbon atoms in positions 13, 17, 18, 20 and 21 are shown. The remainder of the carbocyclic steroid molecules is not illustrated. The conversion of I to II is effected by a treatment of I with ethylidenetriphenylphosphorane. The conversion of II to III is effected by treating II with hydroboron and then with hydrogen peroxide. The term hydroboron, as used herein, refers to a moiety consisting of one atom of trivalent boron and one atom of hydrogen. The moiety, accordingly, has two free valences and can be pictured as follows:

It can be supplied, for example, by borane (as the term borane is used herein it is intended to mean $BH_3$ in all its forms, e.g. as borane per se, as diborane or as a complex), or by lower alkylborane or dilower alkylborane.

The conversion of I→II→III can be effected with starting material 17-oxo-steroids of the androstane series. However, any oxo groups, other than that in the 17-position, in the starting material 17-oxo-steroid (I) should be protected prior to the treatment with the ethylidenetriphenylphosphorane. The present invention thus comprehends a process for the preparation of a carbocyclic 20-hydroxy-steroid of the 17β-pregnane series having a cis relationship between the $C_{18}$ methyl group and the $C_{17}$ side chain comprising the steps of reacting a carbocyclic 17-oxo-steroid of the androstane series, wherein all oxo groups in other than the 17-position are protected, with ethylidenetriphenylphosphorane and treating the so-obtained $\Delta^{17(20)}$-pregnene with hydroboron and then hydrogen peroxide.

The presence of double bonds in the starting material 17-oxo-steroid molecule, e.g., between $C_2$ and $C_3$, $C_6$ and $C_7$, etc., leads to the attack of these double bonds by the hydroboron-hydrogen peroxide treatment with consequent hydration thereof, without interference with the desired introduction of the hydroxyethyl side chain. However, since the end-products thus obtained contain a ring hydroxy substituent, such constitutes one aspect of this invention, and a separate aspect of this invention is to use as a starting material a nonolefinic, carbocyclic 17-oxo-steroid of the androstane series.

The term olefinic as used herein indicates a nonaromatic unsaturation between two carbon atoms. The term nonolefinic thus comprehends both fully saturated steroids as well as aromatically unsaturated steroids, for example, steroids having an aromatic A-ring.

Inasmuch as substituents such as those containing a carbonyl moiety (e.g. carboxyl groups, esters thereof, amides, alkanoyl groups) and nitriles would be affected by the borane treatment of the process of this invention, it is preferable that the 17-oxo-steroid of the androstane series used as a starting material not contain any such substituent. In the case of other substituents found in pharmacologically active steroids, such as lower alkyl, halo, hydroxy, ether groups such as lower alkoxy and tetrahydropyranyloxy, and the like, which substituents are not affected by the treatments involved, the process of this invention is, of course, suitable. Thus, the starting material carbocyclic 17-oxo-steroid of the androstane series can contain a number of substituents in the molecule without interfering with the process of this invention. For example, it can have: lower alkyl groups, hydroxy groups, lower alkoxy groups, tetrahydropyranyloxy, halogen atoms, etc., at positions 1, 2, 3, 4, 5, 6, 7, 8, 9, 10, 11, 12, 14, 15, 16, 18 and/or 19.

As indicated above, oxo groups in other than the 17-position of the starting material 17-oxo-steroids should be protected prior to the treatment with ethylidenetriphenylphosphorane. It is convenient to initially protect any such oxo substituent present and maintain the substituent in its protected form throughout the entire reaction sequence, regenerating the oxo substituent, if desired, only after the desired 20-hydroxy-steroid of the 17β-pregnane series is obtained. On the other hand, if desired, the protecting group can be split off after the ethylidenetriphenylphosphorane treatment to yield the Δ$^{17(20)}$-steroid represented by the partial Formula II supra. The protecting group can be inserted and split off by means known per se. Thus, oxo groups present in other than the 17-position can be selectively reduced to hydroxy groups. When desired, to oxo groups can then be regenerated by a conventional oxidation means, for example, via oxidation with chromium trioxide in an acidic solution such as glacial acetic acid. If desired, this can be combined with the simultaneous oxidation of the 20-hydroxy substituent, obtained by the process of this invention, to a 20-oxo moiety. Oxo groups present in other than the 17-position can also be protected by ketalization, i.e., by reaction with a lower alkane-diol to yield a lower alkylene-dioxy substituent, which subsequently, when desired, can be removed by means known per se, for example, by mild acid hydrolysis, thereby yielding the desired oxo substituent.

The first stage of the process of the present invention involves the reaction of a carbocyclic 17-oxo-steroid of the androstane series, wherein all oxo groups in other than the 17-position are protected, with ethylidenetriphenylphosphorane to yield a Δ$^{17(20)}$-pregnene represented by the partial Formula II above. This reaction is suitably effected in a neutral, nonketonic organic solvent. Organic solvents which can be used are, for example: ethers, e.g., lower alkyl ethers such as diethyl ether, dioxane, tetrahydrofuran, or the like; aromatic hydrocarbons such as benzene, xylene, cumene, or the like; di-lower alkyl-lower alkanoyl-amides such as dimethylformamide, dimethylacetamide, or the like; dimethylsulfoxide; etc. It is especially preferred to conduct the reaction with ethylidenetriphenylphosphorane in the same solvent as that in which the ethylidenetriphenylphosphorane is formed. Since ethylidenetriphenylphosphorane is conveniently formed in dimethylsulfoxide, this latter compound is also a preferred solvent for the reaction of the 17-oxo-steroid with ethylidenetriphenylphosphorane.

The reaction of the ethylidenetriphenylphosphorane with the 17-oxo-steroid of the androstane series is suitably conducted at a temperature between room temperature and about 120° C. or the boiling point of the reaction medium, whichever is lower. It has been found that the preferable temperature range in which to conduct the reaction is between about 40° C. and about 80° C. Especially good results are obtained when the reaction is conducted between about 40° C. and about 60° C., and accordingly this is an especially preferred temperature range. The quantity of reactants used is not critical and an excess of either can be used. However, it has been found advantageous to use a molar excess of the ethylidenetriphenylphosphorane and especially preferable to use at least about 4 moles of the ethylidenetriphenylphosphorane for each mole of the 17-oxo-steroid being reacted.

The second stage of the process of this invention involves the treatment of Δ$^{17(20)}$-pregnene obtained from the first stage with hydroboron and then hydrogen peroxide, which stage yields the desired 20-hydroxy steroid of the 17β-pregnane series having a cis relationship between the $C_{18}$ methyl group and the $C_{17}$ side chain. In the first aspect of the second stage of the process of this invention, a carbocyclic Δ$^{17(20)}$-steroid of the 17β-pregnane series is treated with hydroboron. The hydroboron can be obtained, for example, from borane, alkylborane or dialkylborane. The term alkylborane comprehends compounds of the formula $$RBH_2 \qquad\qquad IV$$

wherein R is a saturated, straight or branched chain hydrocarbon radical such as lower alkyl, for example, t-hexyl (in which case the compound of Formula IV is 2,3-dimethyl-2-butylborane).

The term dialkylborane comprehends compounds of the formula $$R_2BH \qquad\qquad V$$

wherein each R can be the same or different and R is a saturated, straight or branched chain hydrocarbon radical such as lower alkyl, for example, isoamyl [if both R's are isoamyl, the compound of Formula V is bis-(3-methyl-1-butyl)-borane].

The treatment with hydrocarbon is preferably effected in an organic solvent: for example, an ether such as a lower alkyl ether, e.g., diethyl ether, dioxane, tetrahydrofuran or the like. When borane is used as the agent yielding the hydroboron, the borane can either be added to the reaction mixture or can be generated in situ. The reaction with the borane is suitably conducted at a temperature between about −20° C. and about 40° C. It is preferably conducted at a temperature between about 0° C. and room temperature. For ease of operation, room temperature is preferred.

In one embodiment it is suitable to add the borane in the form of borane complex, for example, with an ether. A borane: tetrahydrofuran combination has been found particularly suitable. If such is used, it can be added dissolved in a tetrahydrofuran solution. On the other hand, in a different embodiment, the borane can be generated in situ via the addition of a hydride and an acid, either one of which or both of which can contain the element boron. Thus, an alkali metal borohydride (such as sodium borohydride, potassium borohydride, lithium borohydride or the like) and a Lewis acid (such as boron trifluoride, sulfuric acid or the like) can be added to the reaction mixture, thereby generating borane in situ. On the other hand, a nonboron-containing hydride and an acid-containing boron can be added to the reaction mixture, thereby generating borane in situ. As exemplary nonboron-containing hydrides there can be mentioned alkali metal hydrides such as sodium hydride and alkali metal aluminum hydrides such as lithium aluminum hydride. Exemplary boron-containing Lewis acids are boron trihalides, for example, boron trifluoride or boron trichloride.

Where a nonolefinic starting material has been used for the first stage of the process of this invention, at least one mole of hydroboron (calculated as BH) should be used for each mole of the Δ$^{17(20)}$-pregnene being treated. If the starting material 17-oxo-steroid contains one or more double bonds, a proportionately greater quantity of hydroboron should be used to allow for the hydroboration of these double bonds. With nonolefinic 17-oxo-steroid starting materials it is suitable to use between one and about two moles of hydroboron for each mole of Δ$^{17(20)}$-pregnene. It has been found especially advantageous, for example, to use between 1 and 1½ moles of borane for each mole of Δ$^{17(20)}$-pregnene.

Following the treatment with hydroboron, the reaction mixture is adjusted to a pH greater than 7, i.e., is rendered alkaline. This can conveniently be done via the addition of an alkali hydroxide such as caustic soda, or by the addition of a salt of a strong base with a weak acid, or via the addition of an appropriate buffering solution, or by any other conventional means. Hydrogen peroxide is then added to the reaction mixture. The hydrogen peroxide should be used in at least an equimolar amount (with respect to a starting material nonolefinic 17-oxo-steroid, more if a 17-oxo-steroid containing one or more double bonds is used as a starting material in the first stage; see discussion supra re quantity of hydroboron to be used), but can be used in excess if desired. The hydrogen peroxide is conveniently added in the form of an aqueous solution. The treatment with hydrogen peroxide can be effected at room temperature, but is suitably effected at lower temperatures, for example, at about 0° C.

As pointed out above, the two stage sequence of the process of this invention yields carbocyclic 20-hydroxy steroids of the 17β-pregnane series. This desired 17β configuration is obtained even with starting material 17-oxosteroids of the androstane series having the unnatural 9β,10α-configuration. Thus, for example, via the process of this invention 3β-hydroxy-5α-androstan-17-one (isoandrosterone) can be converted to 5α-pregnane-3β,20-diol, 3α-hydroxy-5β,9β,10α-androstan-17-one can be converted to 5β,9β,10α-pregnane-3α,20-diol and estrone can be converted to 3-hydroxy-17β-(1′-hydroxyethyl)-estra-1,3,5(10)-triene. Similarly, derivatives of estrone wherein the 3-hydroxy group is etherified, for example, 3-lower alkoxy ethers corresponding to estrone can be converted to 3-lower alkoxy-17β-(1′-hydroxyethyl)-estra-1,3,5(10)-triene. The process of this invention has application to the preparation of numerous other valuable 20-hydroxy-steroids of the 17β-pregnane series from corresponding carbocyclic 17-oxo-steroids of the androstane series. In addition to undergoing oxidation, as described above, the 20-hydroxy-steroids of the 17β-pregnane series obtained by the process of this invention can also be esterified, for example, by conventional esterification means such as treatment with a lower alkanoyl anhydride or lower alkanoyl halide (preferably bromide or chloride) in the presence of pyridine. Such treatment will also result in esterification of other hydroxy groups present on the steroid nucleus, for example, treatment of a 3,20-dihydroxy compound with acetic anhydride or acetyl chloride in pyridine yields the corresponding 3,20-diacetoxy compound.

3,20-dihydroxy-estra-1,3,5(10)-triene, the corresponding 3,20-dilower alkanoyloxy esters, the corresponding 3-lower alkoxy ethers and the 20-lower alkanoyloxy esters of the 3-lower alkoxy ethers are novel compounds obtained by the process of this invention and are within the scope of this invention. These compounds represent valuable intermediates for the preparation of 19-norprogesterone. The compounds containing a 3-lower alkanoyloxy group can be hydrolyzed to corresponding 3-hydroxy compounds. The 3-hydroxy-estra-1,3,5(10)-trienes can be etherified according to known methods to yield a 3-lower alkoxy ether. It is these 3-lower alkoxy ethers which can then be converted to 19-norprogesterone. The conversion can be effected by first submitting the estra-1,3,5(10)-triene 3-lower alkoxy ether to a Birch reduction, suitably effected by sodium or lithium in liquid ammonia followed by treatment with ethanol after which the ammonia is evaporated off. Water is then added and the intermediate enol-ether is extracted with an organic solvent. To obtain the desired 19-norprogesterone, the intermediate enolether, with or without isolation, can then be hydrolyzed and oxidized (in either sequence), but it is preferable to hydrolyze first. The hydrolysis can be effected by the addition of a mineral acid having a pH no greater than 1, such as hydrogen chloride, and the oxidation of the 20-hydroxy group to a 20-oxo moiety can be effected by the use of a conventional oxidizing agent such as chromium trioxide in acetone, acetic acid, dimethylformamide or pyridine. The hydrolysis is preferably conducted at the reflux temperature of the reaction medium.

The intermediate enol-ethers are 3-lower alkoxy-19-nor-Δ$^{2,5(10)}$-pregnadien-20-ols. These compounds are valuable intermediates and in addition to being convertible into 3-oxo-Δ$^4$-pregnenes by treatment with mineral acids, as described above, can also be converted into 3-oxo-Δ$^{5(10)}$-pregnenes by hydrolysis under weaker conditions than those described above and oxidation. This hydrolysis can be effected, for example, by treatment with a weak acid, for example, an organic acid such as lower alkanoic acid, for example, acetic acid, or a lower alkanedioic acid, for example, oxalic acid or adipic acid, or of use of dilute mineral (e.g. hydrogen chloride, hydrogen bromide, and the like) or sulfonic (e.g. methanesulfonic, toluenesulfonic, and the like) acids having a pH of at least about 2 and no greater than about 6. The hydrolysis to Δ$^{5(10)}$-pregnenes is preferably effected at about room temperature. Oxidation of the so-obtained 20-ol compound to a 20-oxo compound can be conducted under the same conditions as described above.

The so-obtainable 17β-acetyl and 17β-(1′-hydroxyethyl)-19-nor-3-oxo-Δ$^{5(10)}$-pregnenes are useful themselves as chemical intermediates and also are useful as progestational agents. They can be administered internally, for example, orally, in the form of conventional pharmaceutical formulations, for example, as tablets or capsules containing usual pharmaceutical excipients. They can be used in the same way as known orally active steroidal progestational agents.

The 3-hydroxy-17-ethylidene-estra-1,3,5(10)-triene and corresponding 3-lower alkoxy ethers and 3-lower alkanoyloxy esters obtained by the process of this invention are novel compounds, and are within the scope of this invention. They are useful as intermediates as described above, and also the 3-hydroxy, 3-lower alkanoyloxy and 3-lower alkoxy-17-ethylidene-estra-1,3,5(10)-triene are useful as estrogens. They can be administered internally, for example, orally, in the form of conventional pharmaceutical formulations, for example, as tablets and capsules containing usual pharmaceutical excipients. They can be used in the same way as known orally active steroidal estrogens.

The following examples are illustrative but not limitative of the invention. The symbol THP represents tetrahydropyranyl. All temperatures are stated in degrees centigrade.

Example 1

3.0 g. of a 53.4% sodium hydride dispersion in mineral oil (67 mmoles of sodium hydride) was washed 3 times with hexane and blown dry under nitrogen. 50 ml. or dimethylsulfoxide was added thereto and the mixture then heated under nitrogen with stirring at 70–75° until cessation of hydrogen evolution. After about 30 min., there resulted a light green solution which was cooled to room temperature. A solution of 27.9 g. (67 mmoles) of ethyltriphenylphosphonium iodide in 100 ml. of dimethylsulfoxide was then rapidly added to the cooled solution, yielding a deep red solution of ethylidenetriphenylphosphorane, which was subsequently used in the reactions described below.

The ethylidenetriphenylphosphorane solution for use in the reactions described below can also be prepared by other methods, for example, it was prepared by the following alternative methods:

To a solution of 50 g. of ethyltriphenylphosphonium bromide in 200 ml. of dimethylsulfoxide was added 15 g. of potassium t-butoxide in small portions. After stirring for half an hour at room temperature, the so-formed solution of ethylidenetriphenylphosphorane was then used for the reactions described below.

To a solution of ethyltriphenylphosphonium iodide in 250 ml. of dimethylsulfoxide was added 7.3 g. of potassium amide in 50 cc. of dimethylsulfoxide. After stirring for half an hour at room temperature, the so-formed solution of ethylidenetriphenylphosphorane was then used for the reactions described below.

Example 2

To a prepared solution of 67 mmoles of ethylidenetriphenylphosphorane, there was rapidly added a solution of 5.0 g. of isoandrosterone THP ether in 100 ml. of dry tetrahydrofuran. The reaction mixture was then heated overnight under nitrogen at 50–55° with stirring, cooled and poured into water. The reaction mixture was then extracted with 3 portions of hexane, and the combined organic extracts washed 3 times with water, dried with sodium sulfate and concentrated under reduced pressure. The concentrated solution, containing some precipitated triphenylphosphine oxide, was then filtered through a short column of alumina (Grade I) with hexane yielding as the eluate crude Δ$^{17(20)}$-5α-pregnen-3β-THP-ether, M.P. 67–73° consisting of a mixture of the cis and trans forms, predominately the cis forms.

To avoid the complications of diasteroisomerism, this material was hydrolyzed to the free 3β alcohol as described in Example 3 below.

Example 3

500 mg. of crude $\Delta^{17(20)}$-5α-pregnen-3β-THP-ether prepared according to the procedure of Example 2 was dissolved in 15 ml. of 0.2 N hydrochloric acid in ethanol and allowed to remain at room temperature for 1.5 hours. The solution was then diluted with ether, washed twice with 5% $NaHCO_3$, dried with $Na_2SO_4$ and evaporated. The residue was then crystallized from methanol affording cis-$\Delta^{17(20)}$-5α-pregnen-3β-ol as fine needles, M.P. 153–154°.

Example 4

To a prepared solution of 67 mmoles of ethylidenetriphenylphosphorane in dimethylsulfoxide, there was added a solution of 3.88 g. of isoandrosterone in 100 ml. of dimethylsulfoxide. The reaction mixture was then heated at 55–60° with stirring under nitrogen for 5 hrs. (at which time thin layer chromatography indicated only traces of starting material present), cooled and poured into water. After extraction of the reaction mixture with 3 portions of ether, the combined ether extracts were washed repeatedly with water, dried with $Na_2SO_4$, and evaporated. The residue was then dissolved in a minimal amount of hot hexanbenzene (3:1) and filtered through 120 g. of alumina (Grade III) with 3000 ml. of the above solvent. The eluate, consisting of product and triphenylphosphine oxide, was then slurried with 200 ml. of ether, filtered and evaporated yielding a residue which was crystallized from methanol yielding cis - $\Delta^{17(20)}$ - 5α-pregnen-3β-ol, M.P. 153–154°.

Example 5

To a solution of 500 mg. of cis-$\Delta^{17(20)}$-5α-pregnen-3β-ol in 20 ml. of dry tetrahydrofuran under nitrogen, there was added with stirring 3 ml. of approximately 1 molar solution of borane in tetrahydrofuran. After stirring at room temperature for 1 hr., 12 ml. of 10% NaOH solution is cautiously added dropwise. The mixture was then cooled to 0° and 8 ml. of 30% hydrogen peroxide added in the course of 10 min. with stirring. After a further 1 hr. at 0°, water and ethyl acetate were added and the resultant organic layer separated and washed with 10% $NaHSO_3$ and water, dried with $Na_2SO_4$ and evaporated to afford the product, 5α-pregnane-3β,20α-diol. TLC showed only a trace of impurity.

5α-pregnane-3β,20α-diol was acetylated by treatment with acetic anhydride in pyridine, permitting the reaction mixture to stand at room temperature overnight, and the product, 5α-pregnane-3β,20α-diol diacetate, crystallized from methanol, M.P. 163–165°.

Example 6

A mixture of 100 mg. of cis-$\Delta^{17(20)}$-5α-pregnen-3β-ol and 62 mg. of $NaBH_4$ in tetrahydrofuran was formed. To this mixture there was added 0.26 ml. of $BF_3$:ether complex. The reaction mixture was then worked up according to the procedure of Example 5 above, yielding 5α-pregnane-3β,20α-diol as the product.

Example 7

202 mg. of the hydroboration product, crude 5α-pregnane-3β,20α-diol, was dissolved in 20 ml. of 95% acetic acid. A solution of 150 ml. of $CrO_3$ in 20 ml. of 95% HOAc was then added thereto and the reaction mixture kept at 15° for 1 hour. After the addition of a few drops of methanol, the reaction mixture was concentrated in vacuo, ether and water added and the separated ether layer washed with 5% $NaHCO_3$ until neutral, dried with $Na_2SO_4$ and evaporated. The residue was crystallized from ethanol yielding as the product, 5α-pregnane-3,20-dione, M.P. 195–197°.

Example 8

To a solution of 231 mmoles of ethylidene-triphenylphosphorane in 600 ml. of dimethylsulfoxide was added a solution of 15.5 g. of estrone methyl ether in 400 cc. of benzene. The mixture was then heated at 45° under nitrogen overnight. After quenching with ice-water, the product, 3 - methoxy-cis-19-norpregna-1,3,5(10),17(20)-tetraene, was isolated by extraction with petroleum ether and purified on a column of alumina and crystallized from ether-methanol, M.P. 78°–79°.

Example 9

5 g. of 3-methoxy-cis-19-norpregna-1,3,5(10),17(20)-tetraene was dissolved in 150 ml. of tetrahydrofuran and treated with 10 ml. of a 1 molar solution of borane in tetrahydrofuran at room temperature for 3 hours under nitrogen. After oxidation with 25 cc. of 10% NaOH and 20 cc. of 30% $H_2O_2$ at 0° for 1 hour, the product, 3-methoxy - 19 - norpregna-1,3,5(10)-trien-20α-ol, was isolated by extraction with ether, purified on a column of alumina and crystallized from ether-petroleum ether, M.P. 104°–105°.

Example 10

2 g. of 3-methoxy-19-norpregna-1,3,5(10)-trien-20-ol was oxidized with 2 g. of $CrO_3$ and 0.5 cc. of $H_2SO_4$ in 100 cc. of dimethylformamide. The product, 3-methoxy-19-norpregna-1,3,5(10)-trien-20-one was isolated by extraction with ether; M.P. 134–136°.

Example 11

To a solution of 1 g. of 3-methoxy-19-norpregna-1,3,5(10)-triene-20α-ol in 100 ml. of absolute tetrahydrofuran, 100 ml. of ammonia was added by distillation. 1 g. of lithium was added. Thirty minutes after the addition was complete, 15 cc. of ethanol was added to the reaction mixture. When the blue color disappeared, 50 cc. of $H_2O$ was added, the ammonia evaporated, and the residue extracted with ethyl acetate and washed until neutral. After drying, and evaporation of the solvent, the crude product, 3-methoxy-19-nor-$\Delta^{2,5(10)}$-pregnadien-20α-ol, was refluxed with 20 cc. of methanol and 15 cc. of 4 N HCl, poured into saturated brine, extracted with ethyl acetate, washed until neutral, dried and evaporated. The crude material was purified on a column of alumina yielding 19-nor-4-pregnen-3-one-20α-ol.

Example 12

The crude 3-methoxy-19-nor-$\Delta^{2,5(10)}$-pregnadien-20α-ol obtained by the procedure of Example 11 above was dissolved in 50 ml. of methanol and a solution of 1.5 g. oxalic acid dihydrate in 10 ml. of water was added thereto. The reaction mixture was then permitted to stand at room temperature for 1 hour, ether and saturated brine added thereto, the ether extract washed with 5% sodium bicarbonate solution, dried and evaporated, yielding 19-nor-3-oxo-$\Delta^{5(10)}$-pregnen-20α-ol.

Example 13

500 mg. of 19-nor-3-oxo-$\Delta^{5(10)}$-pregnene-20α-ol was dissolved in 10 ml. of glacial acetic acid and a solution of 200 mg. of $CrO_3$ in 1.5 ml. water was added thereto. The reaction mixture was then permitted to stand at room temperature for 1 hour, and then a few drops of methanol were added thereto. The reaction mixture was then diluted with ether, and the ether layer washed until neutral with 5% sodium bicarbonate solution. After drying, the solvent was evaporated, yielding 19-nor-$\Delta^{5(10)}$-pregnen-3,20-dione.

Example 14

0.5 g. of 19-nor-4-pregnen-3-one-20α-ol was oxidized with 0.5 g. of $CrO_3$, .1 cc. of $H_2SO_4$ in 30 cc. of dimethylformamide. The product, 19-norprogesterone, was isolated by extraction with ether; M.P. 143–145° after crystallization from methanol.

Example 15

To a solution of 210 mmoles of ethylidene-triphenylphosphorane in 300 ml. of dimethylsulfoxide was added 14 g. of estrone in 300 ml. of dimethylsulfoxide. After heating under nitrogen at 65° overnight, the reaction was quenched with ice-water, and the product, cis-19-norpregna-1,3,5(10),17(20)-tetraen-3-ol, was isolated by extraction with ether and purified on a column of silica gel and by crystallization from ethanol-water, M.P. 138°–139°.

Example 16

7 g. of cis-19-norpregna-1,3,5(10),17(20)-tetraene-3-ol in 200 ml. of tetrahydrofuran was hydroborated in the usual manner with 15 ml. one molar $BH_3$ solution, followed by addition of 40 ml. of 10% NaOH and 30 ml. of $H_2O_2$. The product, 19-nor-pregnane-1,3,5(10)-triene-3,20α-diol, was isolated by extraction with ether, purified on a column of alumina and crystallized from ether-petroleum ether, M.P. 183°–184°.

Example 17

5 g. of 19-norpregnane-1,3,5(10)-triene-3,20α-diol was oxidized with 5 g. of $CrO_3$ and 1 ml. of $H_2SO_4$ in 200 ml. of dimethylformamide. The product, 19-norpregnane-1,3,5(10)-trien-3-ol-20-one, was isolated by extraction with ether; M.P. 243–245°.

Example 18

10 g. of 5β,9β,10α-androstan-3-on-17β-ol was placed in 400 ml. of benzene containing 50 cc. of ethylene glycol and 1.5 g. of p-toluenesulfonic acid. The reaction mixture was heated overnight under reflux with a Dean-Stark trap. The product, 3,3-ethylene-dioxy-5β,9β,10α-androstan-17β-ol, was isolated from benzene.

Example 19

8 g. of 3,3-ethylenedioxy-5β,9β,10α-androstan-17β-ol was oxidized in 350 ml. of dimethylformamide with 8 g. of $CrO_3$ and 3 cc. of $H_2SO_4$. The product, 3,3-ethylenedioxy-5β,9β,10α-androstan-17-one, was isolated by extraction with ether.

Example 20

To a solution of 65 mmoles of ethylidene-triphenylphosphorane in 100 cc. of dimethylformamide was added 5 g. of 3,3-ethylene-dioxy-5β,9β,10α-androstan-17-one in 100 cc. of dimethylsulfoxide. The reaction mixture was heated under nitrogen for 4 hours at 65°, quenched with ice-water and the product, 3,3-ethylenedioxy-cis-$\Delta^{17(20)}$-5β,9β,10α-pregnene, isolated by extraction with petroleum ether and purified on a column of alumina.

Example 21

3 g. of 3,3-ethylenedioxy-cis-$\Delta^{17(20)}$-5β,9β-10α-pregnene was hydroborated in 100 ml. of tetrahydrofuran with 12 cc. one molar $BH_3$ solution followed by 25 cc. of 10% NaOH and 15 cc. of 30% $H_2O_2$. The product 3,3-ethylenedioxy-5β,9β,10α-pregnan-20α-ol, was isolated by extraction with ether.

Example 22

2 g. of 3,3-ethylenedioxy-5β,9β,10α-pregnan-20α-ol was oxidized by treatment with 2 g. of $CrO_3$ and 0.5 ml. of $H_2SO_4$ in 100 ml. of dimethylformamide. The product, 3,3-ethylenedioxy-5β,9β,10α-pregnan-20-one, was isolated by extraction with ether.

Example 23

1.5 g. of 3,3-ethylenedioxy-5β,9β,10α-pregnan-20-one was placed in 30 ml. of 70% aqueous acetic acid for 1 hour at 60°. The product, 5β,9β,10α-pregnan-3,20-dione, was isolated by extraction with $CH_2Cl_2$, M.P. 112–114°.

What is claimed is:

1. A process for the preparation of a carbocyclic 20-hydroxy-steroid of the 17β-pregnane series having a cis relationship between $C_{18}$ methyl group and the $C_{17}$ side chain, comprising the steps of reacting a carbocyclic 17-oxo-steroid of the androstane series, wherein all oxo groups in other than the 17-position are protected, with ethylidenetriphenylphosphorane; and treating the so-obtained $\Delta^{17(20)}$-pregnene with hydroboron and then hydrogen peroxide.

2. A process as in claim 1 wherein the reaction with ethylidenetriphenylphosphorane is conducted in a solvent medium comprising dimethylsulfoxide.

3. A process as in claim 1 where the hydroboron treatment is conducted with borane in a solvent medium comprising tetrahydrofuran.

4. A process as in claim 1 wherein the reaction medium is adjusted to a pH greater than 7 following the treatment with hydroboron and before the treatment with hydrogen peroxide.

5. A process for the preparation of a carbocyclic 9β,10α-20-hydroxy-steroid of the 17β-pregnane series having a cis relationship between the $C_{18}$ methyl group and the $C_{17}$ side chain, comprising the steps of reacting a carbocyclic 9β,10α-17-oxo-steroid of the androstane series, wherein all oxo groups in other than the 17-position are protected, with ethylidenetriphenylphosphorane; and treating the so-obtained $\Delta^{17(20)}$-pregnene with hydroboron and then hydrogen peroxide.

6. 3-OR-17-ethylidene - estra-1,3,5(10)-triene wherein R is selected from the group consisting of hydrogen, lower alkyl, and lower alkanoyl.

7. 3-OR-17β - (1' - hydroxyethyl) - estra - 1,3,5(10)-triene wherein R is selected from the group consisting of lower alkyl and lower alkanoyl.

8. A process for the preparation of a carbocyclic 20-hydroxy-steroid of the 17β-pregnane series having a cis relationship between the $C_{18}$ methyl group and the $C_{17}$ side chain, comprising the treatment of a $\Delta^{17(20)}$-pregnene with hydroboron and then hydrogen peroxide.

9. A process as in claim 8 wherein the $\Delta^{17(20)}$-pregnene is a 9β,10α-$\Delta^{17(20)}$-pregnene.

10. A process as in claim 8 wherein the $\Delta^{17(20)}$-pregnene is a 19-nor-$\Delta^{17(20)}$-pregnene.

11. A process as in claim 8 wherein the $\Delta^{17(20)}$ pregnene is a 1,3,5(10)17(20)-tetraene.

12. A process as in claim 8 wherein the hydroboron treatment is effected with borane.

13. A process as in claim 8 wherein the reaction medium is adjusted to a pH greater than 7 following the treatment with hydroboron and before the treatment with hydrogen peroxide.

14. A process for the preparation of a carbocyclic 20-hydroxy-steroid of the 17β-pregnane series having a cis relationship between the $C_{18}$ methyl group and the $C_{17}$ side chain, which comprises treating a $\Delta^{17(20)}$-pregnene with borane, and then treating with hydrogen peroxide at pH greater than 7.

15. 3,3-R-$\Delta^{17(20)}$-9β,10α-pregnene wherein R is selected from the group consisting of H, OH; H, lower alkoxy; H, tetrahydropyranyloxy; and lower alkylenedioxy.

References Cited

UNITED STATES PATENTS

| | | | |
|---|---|---|---|
| 3,194,821 | 7/1965 | Freiberg et al. | 260—397.4 |
| 3,250,793 | 5/1966 | Fried | 260—397.4 |
| 3,277,123 | 10/1966 | Tokutake | 260—397.4 |
| 3,280,157 | 10/1966 | Legatt et al. | 260—397.4 |

LEWIS GOTTS, *Primary Examiner.*

JOHNNIE R. BROWN, *Examiner.*

ETHEL G. LOVE, *Assistant Examiner.*

UNITED STATES PATENT OFFICE
CERTIFICATE OF CORRECTION

Patent No. 3,385,849                              May 28, 1968

Alan Martin Krubiner et al.

It is certified that error appears in the above identified patent and that said Letters Patent are hereby corrected as shown below:

Column 3, line 10, "to oxo groups" should read -- the oxo groups --. Column 4, line 10, "hydrocarbon" should read -- hydroboron --. Column 5, line 69, "or of use of" should read -- or by use of --. Column 6, line 33, "50 ml. or" should read -- 50 ml. of --. Column 10, line 26, "and treat-" should read -- and treating --.

Signed and sealed this 3rd day of March 1970.

(SEAL)
Attest:

Edward M. Fletcher, Jr.                       WILLIAM E. SCHUYLER, JR.
Attesting Officer                               Commissioner of Patents